(12) United States Patent
Tavares et al.

(10) Patent No.: US 7,864,771 B2
(45) Date of Patent: Jan. 4, 2011

(54) PARSING OUT OF ORDER DATA PACKETS AT A CONTENT GATEWAY OF A NETWORK

(75) Inventors: Humberto Tavares, Cary, NC (US); Christopher C. O'Rourke, Apex, NC (US); Robert Batz, Raleigh, NC (US); Walter Dixon, Fuquay Varina, NC (US); Robert Mackie, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 11/738,358

(22) Filed: Apr. 20, 2007

(65) Prior Publication Data

US 2008/0259926 A1 Oct. 23, 2008

(51) Int. Cl.
*H04L 12/28* (2006.01)
*H04L 12/56* (2006.01)

(52) U.S. Cl. .............. 370/394; 370/389; 370/392; 709/224; 709/232; 709/235

(58) Field of Classification Search ............... 370/394, 370/328, 241, 401, 389, 310, 231, 392, 252, 370/236; 709/231, 247, 218
See application file for complete search history.

(56) References Cited

U.S. PATENT DOCUMENTS

| | | | | |
|---|---|---|---|---|
| 6,711,128 B1* | 3/2004 | Ramakrishnan | ............ | 370/230 |
| 6,757,248 B1* | 6/2004 | Li et al. | ............ | 370/235 |
| 6,958,997 B1* | 10/2005 | Bolton | ............ | 370/392 |
| 7,120,149 B2* | 10/2006 | Salamat | ............ | 370/394 |
| 7,203,657 B1* | 4/2007 | Noam | ............ | 705/26 |
| 7,269,727 B1* | 9/2007 | Mukherjee et al. | ............ | 713/160 |
| 7,366,132 B2* | 4/2008 | Ramakrishnan et al. | ............ | 370/328 |
| 7,480,301 B2* | 1/2009 | Krishnan et al. | ............ | 370/394 |

(Continued)

FOREIGN PATENT DOCUMENTS

WO  WO 2008/130965 A1  10/2008

OTHER PUBLICATIONS

Cisco Systems, Inc., Enhancing Usage Analysis with Cisco Service Control, /application/pdf/en/us/guest/products/ps6150/c1031/cdccont_0900aecd804195e.pdf, Jan. 1, 2005, p. 9 Volume http://cisco.com, Publisher: Cisco Systems, Inc., Published in: San Jose, CA Internet.

(Continued)

*Primary Examiner*—Michael J Moore, Jr.
(74) *Attorney, Agent, or Firm*—Patent Capital Group (57) ABSTRACT

In one embodiment, a method includes receiving, at a local node of a network, a sequenced data packet of a flow made up of multiple sequenced data packets from a source node directed toward a destination node. The flow is to be parsed by the local node to describe the flow for administration of the network. Based on sequence data in the sequenced data packet, it is determined whether the sequenced data packet is out of order in the flow. If it is determined that the sequenced data packet is out of order, then the sequenced data packet is forwarded toward the destination node before parsing the sequenced data packet. The out of order sequenced data packet is also stored for subsequent parsing at the local node.

20 Claims, 6 Drawing Sheets

U.S. PATENT DOCUMENTS

| | | | |
|---|---|---|---|
| 7,496,038 B2 * | 2/2009 | Krishna et al. | 370/235 |
| 7,586,948 B2 * | 9/2009 | Hiddink et al. | 370/473 |
| 7,626,933 B1 * | 12/2009 | Ramakrishnan | 370/235 |
| 7,630,305 B2 * | 12/2009 | Samuels et al. | 370/229 |
| 7,664,026 B2 * | 2/2010 | Huang et al. | 370/231 |
| 2001/0021176 A1 * | 9/2001 | Mimura et al. | 370/235 |
| 2002/0105910 A1 | 8/2002 | Maher et al. | |
| 2002/0122385 A1 | 9/2002 | Banerjee | |
| 2002/0199098 A1 * | 12/2002 | Davis | 713/160 |
| 2005/0008017 A1 | 1/2005 | Datta et al. | |
| 2005/0165985 A1 | 7/2005 | Vangal et al. | |
| 2006/0072595 A1 * | 4/2006 | Broberg et al. | 370/410 |
| 2006/0187846 A1 * | 8/2006 | Pelletier et al. | 370/252 |
| 2006/0268780 A1 * | 11/2006 | Chou et al. | 370/331 |
| 2007/0165643 A1 * | 7/2007 | Mooney et al. | 370/394 |
| 2008/0259926 A1 | 10/2008 | Tavares et al. | |

OTHER PUBLICATIONS

Cisco Systems, Inc., Subscriber Control and Billing with the Cisco Content Services Gateway, /warp/public/cc/pd/witc/csvcgtwy/prodlit/iscon_wp.pdf, Jan. 1, 2003, p. 15, Volume http://www.cisco.com, Publisher: Cisco Systems, Inc., Published in: San Jose, CA Internet.

PCT, Notification of Transmittal of the International Search Report and Written Opinion of the International Searching Authority, or the Declaration (1 page) and International Search Report (2 pages) for International Application No. PCT/US08/60417 mailed Aug. 1, 2008.

PCT, International Preliminary Report on Patentability dated Oct. 20, 2009 (1 page) and Written Opinion of the International Searching Authority mailed Aug. 1, 2008 (3 pages) for International Application No. PCT/US08/60417.

* cited by examiner

PARSING OUT OF ORDER DATA PACKETS AT A CONTENT GATEWAY OF A NETWORK

BACKGROUND OF THE INVENTION

1. Field of the Invention

The present invention relates to parsing data packets at a gateway node to a network in order to administer the network based on contents of the data packets passing through the gateway.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Some intermediate network nodes serve as gateways to networks or portions of networks of particular network service providers. Such a gateway node (called a gateway hereinafter) not only forwards data packets but also serves some other function for administration of the provider's network, such as limiting access to authorized users only. In addition, some intermediate network nodes serve as content gateways. Such a content gateway provides a function for administration of the network based on the contents of one or more data packets in a flow of data packets between the same two end nodes. Functions of content gateways include assessing portions of traffic due to different types of payloads, e.g., Web pages, file transfer, email, and streaming of audio and video contents, routing based on type of payload, and differential billing for different types of payloads, among other functions.

Such content gateways must parse the data in the payload of several data packets associated with each flow between the same two end nodes. Parsing involves interpreting the data in one or more payloads. Such parsing is quicker and easier when the packets are parsed in order, because the meaning of at least some data depends on its position in a flow of data packets. Several transport layer protocols, such as the Transmission Control Protocol (TCP) support ordering of data packets by including a sequence number in each data packet.

Currently, content gateways deal with data packets of a flow that arrive out of order by storing the out of order packets until the missing packet arrives. Data packets are not forwarded until they are parsed in order to prevent unauthorized use of the provider's network resources. When the missing data packet is received, parsing of the missing and out of order data packets is able to continue. These parsed data packets are then forwarded. A problem with this approach is that network throughput is significantly decreased in some circumstances, especially when incoming flows pass over a less reliable access network with frequent dropped packets.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Techniques are described for parsing out of order data packets on a content gateway. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Several embodiments are described below in the context of TCP data packets of a reliable flow received at a content gateway between an access network and a provider's network and acknowledged using a TCP selective acknowledgement option (SACK). However, the invention is not limited to this context. In other embodiments, one or more content gateways are situated between the same or different networks or sub-networks using sequenced data packets of the same or different protocol in unreliable flows that are not acknowledged or reliable flows acknowledged with or without SACK.

1.0 Overview

In one set of embodiments, a method includes receiving, at a local node of a network, a sequenced data packet of a flow made up of multiple sequenced data packets from a source node directed toward a destination node. The flow is to be parsed by the local node to determine particular data in the flow used to describe the flow for administration of the network. Based on sequence data in the sequenced data packet, it is determined whether the sequenced data packet is out of order in the flow. If it is determined that the sequenced data packet is out of order, then the sequenced data packet is forwarded toward the destination node before parsing the sequenced data packet. The out of order sequenced data packet is also stored for subsequent parsing at the local node.

In various other embodiments, an apparatus or software is configured to cause one or more steps of the above method to be performed.

2.0 Network Overview

Communications between network nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information used by the protocol, such as the source of the packet, its destination, the length of the payload, and other properties. Often, the data in the payload for the particular protocol includes a header and payload for a different protocol associated with a different layer of detail for information exchange. The header for a particular protocol may indicate a type for the next protocol contained in its payload. The usually higher layer protocol in the payload is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information defining a particular communication link between one network node and an adjacent node. The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source or destination addresses in the packet's data-link header may be updated, as necessary. However, the source and destination IP addresses typically remain unchanged as the packet is transferred from link to link in the network. The IP payload often includes data for an application (layer 7 header and payload).

Routers and switches are network devices that determine which communication link or links to employ to support the progress of data packets through the network. A network node that determines which links to employ based on information in the internetwork header (layer 3) is called a router.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

Figure 1:
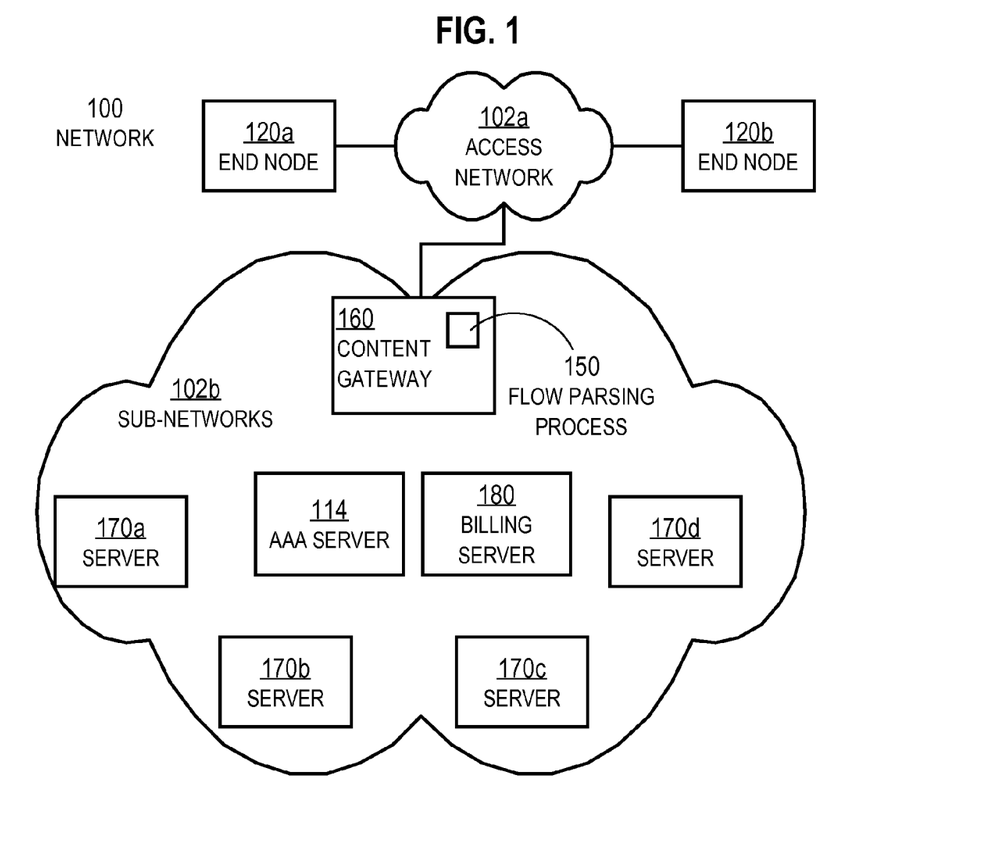
FIG. 1 illustrates an example network with a content gateway.

FIG. 1 illustrates an example network 100 with a content gateway 160. Network 100 includes access network 102a and various sub-networks 102b. End node 120a and end node 120b (collectively referenced hereinafter as end nodes 120) are connected to access network 102a. In some embodiments, access network 102a is a wireless access network. A user of an end node 120 requests resources available on various sub-networks 102b.

Various sub-networks 102b includes content gateway 160, an authentication, authorization and accounting (AAA) server 114 and billing server 180, as well as other server 170a, server 170b, server 170c, server 170d (collectively referenced hereinafter as servers 170). In some embodiments, sub-network 102b is a portion called a walled garden of a larger provider network (not shown). The walled garden hosts special content for which a premium is paid, and billing is dependent on the content type and amount retrieved. One or more intermediate nodes on access network 102a are connected directly as shown, or indirectly through a larger provider network (not shown), to content gateway 160. The AAA server 114, such as a Remote Authentication Dial In User Service (RADIUS) server, is used by content gateway 160 to verify a user of data packets received at gateway 160 and is the recipient of some data parsed from data packets received at gateway 160. The billing server 180 is used by content gateway 160 to determine accounts of a user of data packets received at gateway 160 and is the recipient of some data parsed from data packets received at gateway 160, such as data concerning the resources obtained (such as location, amount and types of payloads requested by user). The parsed data is utilized by billing server 180 to charge a user for the resources obtained by the user. The servers 170 provide various resources desired by a user, such as web pages, data files, email, audio, video and gaming resources.

Although FIG. 1 depicts a particular number and type of networks 102a, 102b, end nodes 120, gateway 160 and servers 170 for purposes of illustration, in other embodiments a network includes the same, more or fewer end nodes and servers and the same or more content gateways 160 and other gateways.

Figure 2:
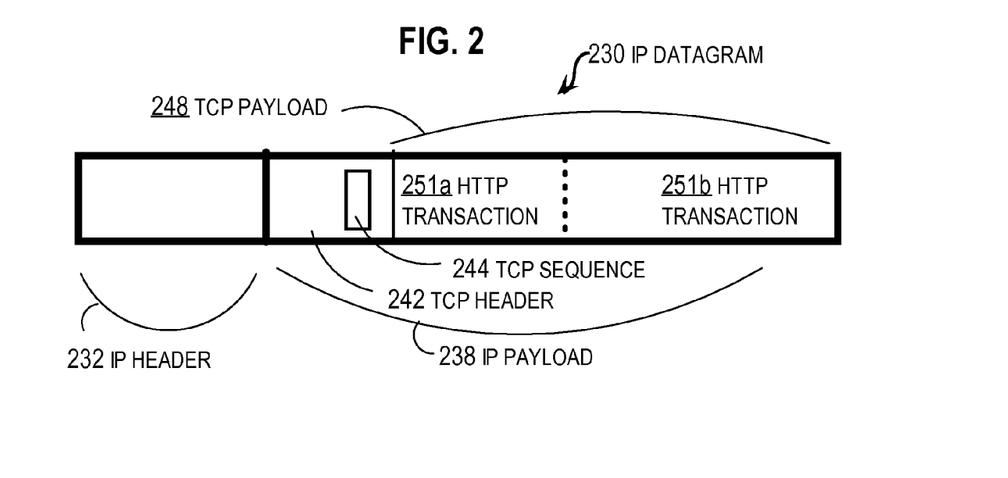
FIG. 2 illustrates an example sequenced data packet.

FIG. 2 illustrates an example sequenced data packet 230. In FIG. 2 the sequenced data packet is a TCP packet. The TCP data packet has an IP datagram 230 that includes an IP header 232 and an IP payload 238. The IP payload 238 includes the TCP portion of the TCP data packet. The TCP portion includes a TCP header 242 and a TCP payload 248. The TCP header includes a TCP sequence field 244. The TCP sequence field 244 holds data that indicates a unique sequence number for each data packet in a flow, which sequence number changes monotonically so as to indicate the proper sequence of data packets in the flow. In TCP, for example, the sequence field 244 indicates the total number of octets sent, including the current data packet, added to an arbitrary starting value for a flow. An octet is 8 binary digits (bits), also called a byte.

In the illustrated embodiment, the TCP payload includes layer 7 data that indicates the end of a first HyperText Transfer Protocol (HTTP) transaction 251a and the beginning of a different HTTP transaction 251b. HTTP is used to transfer World Wide Web pages. By parsing the TCP payload (a layer 7 portion of IP datagram 230), the content gateway 160 is able to determine the difference between the two HTTP transactions 251a and 251b; to report this information to the billing server 180; and, allow the billing server 180 to bill the user accordingly.

Although fields 244, 251a, 251b are depicted as contiguous portions of IP datagram 230 in a particular order for purposes of illustration, in other embodiments, one or more portions of fields 244, 251a, 251b are provided in different arrangement.

TCP provides for reliable data flows of multiple data packets each. The flow is reliable because each sent packet is acknowledged by the recipient. TCP packets are uniquely identified and ordered by a sequence number represented by data in the sequence field 244. The recipient node acknowledges receipt of a data packet by reporting the sequence number of the received data packet. According to selective acknowledgement options (SACK), one acknowledgement message can be used to acknowledge multiple sent packets. This decreases use of valuable network bandwidth and processing power on the recipient node. According to SACK, an acknowledgment message from the recipient lists the sequence numbers of the packets received since the previous acknowledgement message. The sender can determine whether any packets are missing from the list of acknowledged sequence numbers, and send again the missing data packet. The sending node saves copies of each packet sent, at least until an acknowledgment for that packet is received. SACK is described in Request for Comments (RFC) 2018 of the Internet Engineering Task Force (IETF) available, along with other RFCs, at Internet domain ietf.org in directory /rfc/. RFC 2018 is available in file named rfc2018.txt in that directory. The entire contents of RFC 2018, entitled "TCP Selective Acknowledgement Options," are hereby incorporated by reference as if fully set forth herein.

Figure 3:
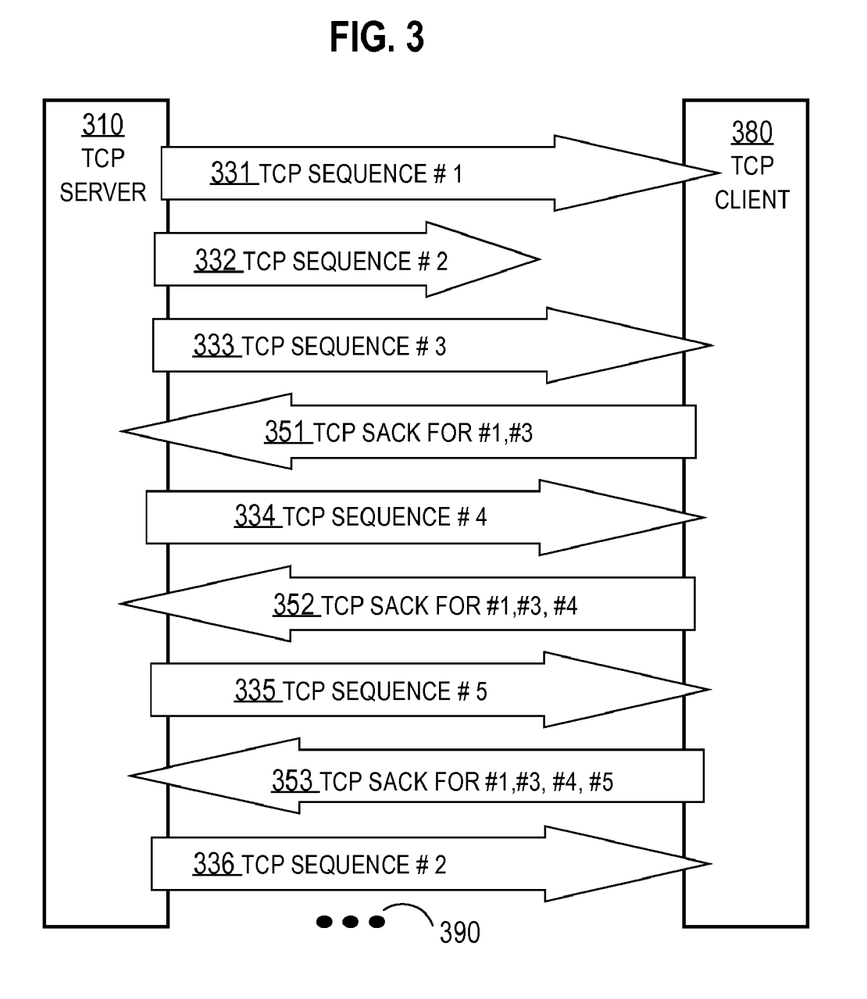
FIG. 3 illustrates an example data flow using efficient selective acknowledgment.

FIG. 3 illustrates an example data flow using efficient selective acknowledgment (SACK). FIG. 3 is a time sequence diagram that illustrates a sequence of TCP data packets exchanged during a TCP session. Time increases downward in FIG. 3. At a particular time a TCP data packet is exchanged between a particular TCP server 310 (e.g., a TCP server executing for content server 170c) and a particular TCP client 380 (e.g., a TCP client executing for end node 120a). The communicating nodes are represented by vertical blocks. A data packet is represented by a horizontal block; and direction of propagation of the data packet is indicated by an arrowhead on the block representing the data packet. Although a particular number of TCP data packets are shown for purposes of illustration, in other embodiments more or fewer TCP data packets are exchanged between TCP server 310 and TCP client 380.

At an earliest depicted time, a TCP data packet 331 with first sequence data (indicated by the symbol #1) is sent from TCP server 310. The arrival of TCP data packet 331 at client 380 is indicated by the intersection of the arrowhead for data packet 331 intersecting the block representing TCP client 380. The arrival of TCP data packet 331 is not immediately acknowledged according to SACK. Instead acknowledgement is sent after a certain time has passed or a certain amount of data has been received or an expected sequence number is skipped, whichever occurs first. For purposes of illustration, it is assumed that a SACK message is sent after 0.5 seconds or after 64,000 bytes are received or an expected sequence number is skipped, whichever occurs first.

It is noted that sequence number are monotonically increasing, but are not usually incremented by one. Instead, sequence numbers are often incremented by the number of bytes sent in each data packet. Furthermore, sequence numbers do not normally start at a fixed first amount, but at a randomly selected number so that different flows use different sequence numbers. For purposes of illustration, successive sequence numbers are represented herein by the symbols #1, #2, #3 etc. However, it is understood that the sequence numbers represented by these symbols are different than the numeral following the # sign.

At a next time, a second TCP data packet 332 with second sequence data (indicated by the symbol #2) is sent from TCP server 310. For some reason the second TCP data packet 332 does not arrive at TCP client 380, as indicated by the arrowhead for data packet 332 not intersecting the block representing TCP client 380.

At a next successive time, a third TCP data packet 333 with third sequence data (indicated by the symbol #3) is sent from TCP server 310. Because the expected sequence number indicated by the symbol #2 has been skipped, the conditions for an acknowledgement are satisfied. Thus TCP server sends a SACK message in data packet 351 that acknowledges receipt of sequence #1 and #3. This notifies TCP server 310 that TCP data packet 332 with sequence #2 has not been received.

To avoid over-reactions, the TCP server 310 does not immediately send the missing packet (e.g., the packet with sequence #2) again because it might already have been received by the TCP client 380 out of order. Instead, the TCP server waits for an appropriate opportunity to re-transmit. In some approaches the TCP server waits for a predetermined, relatively long re-transmission time. In a fast re-transmit mode, the TCP server waits until multiple acknowledgements are received that repeat the same missing sequence number, or a re-transmission time has expired, whichever occurs first. The number of acknowledgments that indicate the same missing data packet is configured.

For purposes of illustration, it is assume that a missing data packet is re-transmitted after three acknowledgement messages indicate the data packet has not yet been received. In this embodiment, at successive times, a fourth TCP data packet 334 with fourth sequence data (indicated by the symbol #4) and a fifth TCP data packet 335 with fifth sequence data (indicated by the symbol #5) are sent from TCP server 310. Because the expected sequence number indicated by the symbol #2 has not yet been received at TCP client 380, the conditions for an acknowledgement are satisfied. Thus TCP server sends a SACK message in data packet 352 that acknowledges receipt of sequence #1 #3 and #4, and a SACK message in data packet 353 that acknowledges receipt of sequence #1 #3, #4 and #5.

The multiple acknowledgement messages in data packets 351, 352 and 353 cause the TCP server 310 to perform a fast re-transmit before the re-transmission time has expired. So TCP server 310 sends again the unacknowledged data packet as data packet 336 with TCP sequence #2. The process continues with further data packets as indicated by ellipsis 390.

The server 310 provides a requested service that is often based, at least in part, on how responsive the client is in acknowledging data sent by the server. For example, if data packets 331 and 333 are acknowledged before the retransmission timer for 332 expires, then the server may not impose TCP congestion control algorithms such as "slow start" due to lack of packet acknowledgement. Preventing server congestion control keeps the data rate higher than if TCP congestion control algorithms were in use.

3.0 Parsing Out of Order Packets

When an intermediate network node parses the sequenced data packets, for any reason, the treatment of an out or order packet can negatively impact efficiency of operations at TCP client 380 and use of bandwidth between server 310 and client 380. This negative impact fostered by the current approach to parsing TCP data packets is illustrated in FIG. 4A.

Figure 4A:
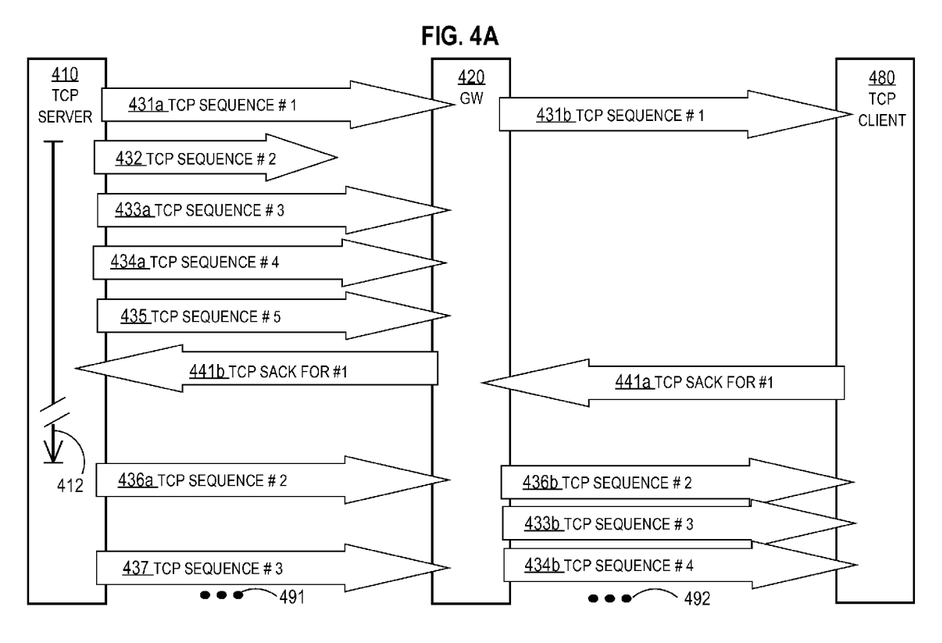
FIG. 4A illustrates an example data flow with a content gateway on which parsing interferes with selective acknowledgement.

FIG. 4A illustrates an example data flow with a content gateway 420 on which parsing interferes with TCP congestion control algorithms that rely on selective acknowledgement (SACK). FIG. 4A is a time sequence diagram that illustrates a sequence of TCP data packets exchanged during a TCP session. Time increases downward in FIG. 4A. At a particular time, a TCP data packet is sent between a particular TCP server 410 (e.g., a TCP server for content server 170c) and a particular TCP client 480 (e.g., a TCP client executing for end node 120a) through an intervening content gateway 420 (such as content gateway 160). Although a particular number of TCP data packets are shown for purposes of illustration, in other embodiments more or fewer TCP data packets are exchanged between TCP server 410 and TCP client 480. The TCP data packets sent from TCP server 410 in FIG. 4A are analogous to those sent by TCP server 310 in FIG. 3.

At an earliest depicted time, a TCP data packet 431a with first sequence data (indicated by the symbol #1) is sent from TCP server 410. TCP data packet 431a arrives at content gateway 420 as indicated by the intersection of the arrowhead for data packet 431a intersecting the block representing gateway 420. The content gateway 420 parses the payload in TCP packet 431a and forwards the data to TCP client 480 in TCP data packet 431b with the first sequence data (sequence #1). The arrival of TCP data packet 431 is not immediately acknowledged according to TCP delayed acknowledgement algorithms that rely on SACK. Instead acknowledgement is sent after a certain time has passed or a certain amount of data has been received or an expected sequence number is skipped, whichever occurs first. Recall that, for purposes of illustration, it is assumed that a TCP SACK message is sent after 0.5 seconds or after 64,000 bytes) are received or an expected sequence number is skipped, whichever occurs first.

At a next time, a second TCP data packet 432 with second sequence data (indicated by the symbol #2) is sent from TCP server 410. For some reason the second TCP data packet 432 does not arrive at content gateway 420, as indicated by the arrowhead for data packet 432 not intersecting the block representing gateway 420.

At a next successive time, a third TCP data packet 433a with third sequence data (indicated by the symbol #3) is sent from TCP server 410 and received at content gateway 420. Gateway 420 recognizes that this data packet is out of order and can not be parsed. The data packet is stored at gateway 420 but not forwarded to TCP client 480.

At next successive times, a fourth TCP data packet 434a with fourth sequence data (indicated by the symbol #4), and a fifth TCP data packet 435 with fifth sequence data (indicated by the symbol #5) are sent from TCP server 310. These last two TCP data packets are received at the content gateway 420. Gateway 420 recognizes that these data packets are also out of order (sequence #2 is still missing) and can not be parsed either. These data packets are stored at gateway 420 but not forwarded to TCP client 480.

Then the conditions for an acknowledgement are satisfied. For example, 0.5 seconds has expired since receipt of data packet 431b at TCP client 480. Thus TCP server sends a TCP SACK message in data packet 441a that acknowledges receipt of sequence #1 only. The content gateway 420 parses the payload in TCP packet 441a and forwards the data to TCP server 410 in TCP data packet 441b which is a TCP SACK acknowledging sequence #1.

As stated above, the rate at which server 410 provides a requested service is often based, at least in part, on how responsive the client is in acknowledging data sent by the server. Since data packet 432 was retransmitted by the server and the client has not acknowledged it by a retransmission timeout; the server may initiate congestion control algorithms such as "slow start" which would negatively impact the connection data rate. Network efficiency is negatively impacted compared to the process depicted in FIG. 3.

The receipt of TCP SACK packet 441b notifies TCP server 410 that TCP data packets 432, 433a, 434a and 435 with sequence #2, #3, #4 and #5, respectively, have not been received at TCP client 480. Again to prevent over-reaction, the TCP server 410 does not re-transmit the missing packet right away but waits until multiple acknowledgements are received that repeat the same missing sequence number, or a re-transmission time has expired, whichever occurs first. In FIG. 4A the re-transmission time after sending missing data packet 432 is indicate by time interval 412. Because no other packets are forwarded by the gateway 420, no other acknowledgements are received from TCP client 480. Therefore the TCP server 410 waits until the relatively long re-transmission time has expired, indicated by time interval 412 before re-transmitting the missing data packet.

After re-transmission time interval 412, TCP server 410 sends again the unacknowledged data packets as data packet 436a with TCP sequence #2, and TCP data packet 437 with TCP sequence # 3 and following data packets with TCP sequence # 4 and #5, followed by any further TCP data packets, as indicated by ellipsis 491.

TCP data packet 436a arrives at content gateway 420 as indicated by the intersection of the arrowhead for data packet 436a intersecting the block representing gateway 420. The content gateway 420 determines that this is not out of order because there is no expected sequence number before sequence #2. Therefore content gateway 420 parses the payload in TCP packet 436a and forwards the data to TCP client 480 in TCP data packet 436b with the sequence #2. The stored data packets 433a, 434a, 435 are no longer out of order, so these are also parsed by gateway 420 and forwarded to TCP client 480. For example, stored data packet 433a with sequence #3 is parsed and forwarded as TCP data packet 433b with sequence #3. Stored data packet 434a with sequence #4 is parsed and forwarded as TCP data packet 434b with sequence #4. Stored data packet 435 with sequence #5 is parsed and forwarded as indicated by ellipsis 492.

Note that the TCP server 410 may forward TCP data packet 437 with sequence #3 and other data packets (e.g., with sequence #4 and sequence #5, indicated by ellipsis 491) which are already stored at content gateway 420 and not needed. The processing on TCP server 410 and bandwidth consumed by such re-transmissions are wasteful of network resources and further the negative impact of this approach to parsing by gateway 420.

According to an illustrated embodiment, the content gateway forwards at least some sequenced data packets before they are parsed and stores those data packets for subsequent parsing when a missing data packet is finally received. This greatly reduces the negative impact of parsing on a gateway; and is illustrated in FIG. 4B.

Figure 4B:
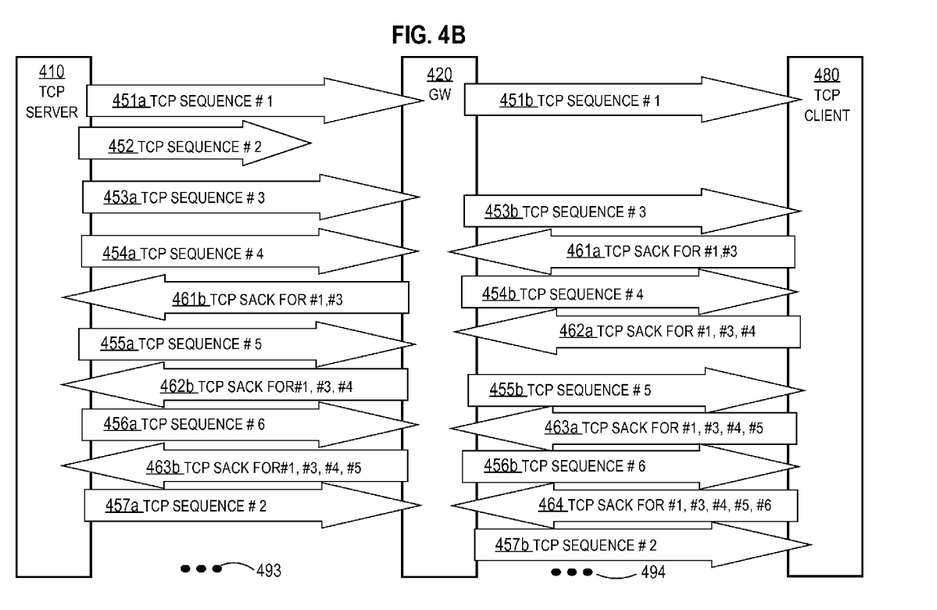
FIG. 4B illustrates an example data flow with a content gateway on which parsing better supports selective acknowledgement.

FIG. 4B illustrates an example data flow with a content gateway on which parsing better supports accelerated and selective acknowledgement. FIG. 4B is a time sequence diagram that illustrates a sequence of TCP data packets exchanged during a TCP session. Time increases downward in FIG. 4B. At a particular time, a TCP data packet is sent between a particular TCP server 410 (e.g., a TCP server for content server 170c) and a particular TCP client 480 (e.g., a TCP client executing for end node 120a) through an intervening content gateway 420 (such as content gateway 160). Although a particular number of TCP data packets are shown for purposes of illustration, in other embodiments more or fewer TCP data packets are exchanged between TCP server 410 and TCP client 480. The TCP data packets sent from TCP server 410 in FIG. 4B are analogous to those sent by TCP server 310 in FIG. 3 and those sent by TCP server 410 in FIG. 4A.

At an earliest depicted time, a TCP data packet 451a with first sequence data (indicated by the symbol #1) is sent from TCP server 410. TCP data packet 451a arrives at content gateway 420 as indicated by the intersection of the arrowhead for data packet 451a intersecting the block representing gateway 420. The content gateway 420 parses the payload in TCP packet 451*a* and forwards the data to TCP client 480 in TCP data packet 451*b* with the first sequence data (sequence #1). The arrival of TCP data packet 451*b* is not immediately acknowledged according to SACK. Instead acknowledgement is sent after a certain time has passed or a certain amount of data has been received or an expected sequence number is skipped, whichever occurs first. Recall that, for purposes of illustration, it is assumed that a SACK message is sent after 0.5 seconds or after 64,000 bytes are received or an expected sequence number is skipped, whichever occurs first.

At a next time, a second TCP data packet 452 with second sequence data (indicated by the symbol #2) is sent from TCP server 410. For some reason the second TCP data packet 452 does not arrive at content gateway 420, as indicated by the arrowhead for data packet 452 not intersecting the block representing gateway 420.

At a next successive time, a third TCP data packet 453*a* with third sequence data (indicated by the symbol #3) is sent from TCP server 410 and received at content gateway 420. Gateway 420 recognizes that this data packet is out of order and can not be parsed. The data packet is stored at gateway 420 but, unlike the processing by the previous gateway, is forwarded to TCP client 480 as TCP data packet 453*b* with sequence #3.

Then the conditions for an acknowledgement are satisfied at TCP client 480 because an expected sequence data indicated by the symbol #2 has been skipped. Thus TCP server sends a TCP SACK message in data packet 461*a* that acknowledges receipt of sequence #1, #3. The content gateway 420 parses the payload in TCP packet 461*a* and forwards the data to TCP server 410 in TCP data packet 461*b* which is a TCP SACK acknowledging sequence #1, #3.

At about the same time as the TCP SACK data packet 461*a* is received, a fourth TCP data packet 454*a* with fourth sequence data (indicated by the symbol #4) is sent from TCP server 410 and received at the content gateway 420. Gateway 420 recognizes that this data packet is also out of order (sequence #2 is still missing) and can not be parsed either. This data packet is stored at gateway 420 but, unlike the processing by the previous gateway in FIG. 4A, is also forwarded to TCP client 480 as TCP data packet 454*b* with sequence #4.

The receipt of TCP data packet 461*b* notifies TCP server 410 that TCP data packet 452 with sequence #2, only, has not been received at TCP client 480. Again to prevent over-reaction, the TCP server 410 does not re-transmit the missing packet right away but waits until multiple acknowledgements are received that repeat the same missing sequence number, or a re-transmission time has expired, whichever occurs first.

When data packet 454*b* is received by TCP client 480, the conditions for an acknowledgement are satisfied again, because an expected sequence data indicated by the symbol #2 has not yet been received. Thus TCP server sends a TCP SACK message in data packet 462*a* that acknowledges receipt of sequence #1, #3 and #4. The content gateway 420 parses the payload in TCP packet 462*a* and forwards the data to TCP server 410 in TCP data packet 462*b* which is a TCP SACK acknowledging sequence #1, #3 and #4.

At about the same time as the TCP SACK data packet 462*a* is received, a fifth TCP data packet 455*a* with fifth sequence data (indicated by the symbol #5) is sent from TCP server 410 and received at the content gateway 420. Gateway 420 recognizes that this data packet is also out of order (sequence #2 is still missing) and can not be parsed either. This data packet is stored at gateway 420 but, unlike the processing by the previous gateway in FIG. 4A, is also forwarded to TCP client 480 as TCP data packet 455*b* with sequence #5.

The receipt of TCP data packet 462*b* notifies TCP server 410 for the second time that TCP data packet 452 with sequence #2, only, has not been received at TCP client 480.

When data packet 455*b* is received by TCP client 480, the conditions for an acknowledgement are satisfied again, because an expected sequence data indicated by the symbol #2 has not yet been received. Thus TCP server sends a TCP SACK message in data packet 463*a* that acknowledges receipt of sequence #1, #3, #4 and #5. The content gateway 420 parses the payload in TCP packet 463*a* and forwards the data to TCP server 410 in TCP data packet 463*b* which is a TCP SACK acknowledging sequence #1, #3, #4 and #5.

At about the same time as the TCP SACK data packet 463*a* is received, a sixth TCP data packet 456*a* with sixth sequence data (indicated by the symbol #6) is sent from TCP server 410 and received at the content gateway 420. Gateway 420 recognizes that this data packet is also out of order (sequence #2 is still missing) and can not be parsed either. This data packet is stored at gateway 420; and is also forwarded to TCP client 480 as TCP data packet 456*b* with sequence #6. When data packet 456*b* is received by TCP client 480, the conditions for an acknowledgement are satisfied again, because an expected sequence data indicated by the symbol #2 has not yet been received. Thus TCP server sends a TCP SACK message in data packet 464*a* that acknowledges receipt of sequence #1, #3, #4, #5 and #6.

The receipt of TCP data packet 463*b* notifies TCP server 410 for the third time that TCP data packet 452 with sequence #2, only, has not been received at TCP client 480.

According to the fast re-transmit mode, the TCP server 410 now sends again the unacknowledged data packet as data packet 457a with TCP sequence #2. TCP data packet 457*a* arrives at content gateway 420. The content gateway 420 determines that this is not out of order because there is no missing sequence before sequence #2. Therefore content gateway 420 parses the payload in TCP packet 457*a* and forwards the data to TCP client 480 in TCP data packet 457*b* with the sequence #2. The stored data packets 453*a*, 454*a*, 455*a* and 456*a* are no longer out of order, so these are also parsed by gateway 420 but do not need to be forwarded to TCP client 480, since they were forwarded earlier. The proper handling and billing of further responses from TCP client 480 is determined based on the completed parsing of data packets 457*a*, 453*a*, 454*a*, 355*a* and 456*a*. It is worth noting that these stored out of order packets could have additional gaps in sequence numbers. In such circumstances, the parsing proceeds up until the next gap in sequence numbers of the stored packets.

About the same time, the conditions for an acknowledgement are satisfied again at TCP client 480. Thus TCP client 480 sends a SACK message in data packet indicated by ellipsis 494 that acknowledges receipt up to sequence #6. The content gateway 420 parses the payload in these acknowledgements and forwards the data to TCP server 410 in TCP data packets indicated by ellipsis 493, which acknowledge sequence number up through sequence #6.

Further exchanges of data packets are also indicated by ellipses 493 and 494. As stated above, the server using TCP server 410 provides a requested service that is often based, at least in part, on how responsive the client is in acknowledging data sent by the TCP server. Since data packets 451*b*, 453*b* and 454*b* are acknowledged in a timely manner and 452*a* is retransmitted quickly as data packet 457*a* due to "TCP fast retransmit," retransmission timer (e.g., of duration 412 depicted in FIG. 4A) does not expire and congestion control is not invoked. Network efficiency is not negatively impacted compared to the process depicted in FIG. 4A.

Note that the TCP server 410 does not re-transmit TCP data packets with sequence #3, #4, #5 and #6 as was done in the flow depicted in FIG. 4A. The processing and bandwidth resources required for such re-transmissions from TCP server 410 are no longer wasted; thus this further negative impact is also avoided. Additionally, the client leveraged the TCP fast retransmit algorithm instead of waiting for a timeout to re-transmit sequence #2.

In some embodiments, the amount of data forwarded without parsing at the content gateway is limited to inhibit fraudulent TCP communications between cooperating TCP clients and TCP servers. Such cooperating TCP clients and servers could attempt to circumvent billing at a content gateway by agreeing to skip an early sequence number in their communications. The skipped sequence number would interrupt parsing (and billing that relies on such parsing) at the gateway, but would not prevent forwarding of the TCP packets.

To limit the benefit to such cooperating, fraudulent TCP end nodes, the content gateway stops forwarding after some maximum amount of data has been forwarded or some maximum amount of time has elapsed without receiving the missing sequenced data packet. The maximum amount is determined by a network administrator for the sub-network that uses the content gateway. For example, after 0.6 seconds and 66,000 bytes have been forwarded, the TCP client should have received several SACKs and re-transmitted the data packet with the missing sequence number. If not, fraudulent cooperation is indicated. Thus, in some embodiments, forwarding is stopped after 0.6 seconds or 66,000 bytes, whichever occurs first.

In some embodiments, the amount of time or data before a SACK is desired, or both, is negotiated or indicated in an early data packet. In some embodiments, the negotiated values are used to determine the maximum amount of data to forward without parsing. To prevent cooperating end nodes from negotiating too high a value, in some embodiments, the negotiated amount is not used if it is greater than some pre-determined values set by the network administrator.

In some embodiments, data packets are forwarded without parsing until a small time after sufficient SACK data packets are received at and forwarded by the content gateway from the TCP client to have triggered a re-transmit by the TCP server, regardless of the amount negotiated. In some embodiments, only one more data packet from the client is forwarded without parsing after sufficient SACK data packets are received at the content gateway from the TCP server regardless of the amount negotiated. In some embodiments, one or more additional data packets or acknowledgments are permitted to account for imperfect communications between the gateway 420 and the TCP server 410. It is well within the capability of those of ordinary skill to determine by experimentation how many additional acknowledgements or data packets should be allowed to prevent too frequent a cessation of forwarding that is not due to fraudulent activity.

It is within the capability of a network administrator to determine a maximum amount to forward without parsing by reasonable experimentation. The network administrator balances the efficiency of network operations by forwarding out of order packets against the risk of lost revenues to cooperating fraudulent end nodes.

4.0 Method at Content Gateway

Figure 5:
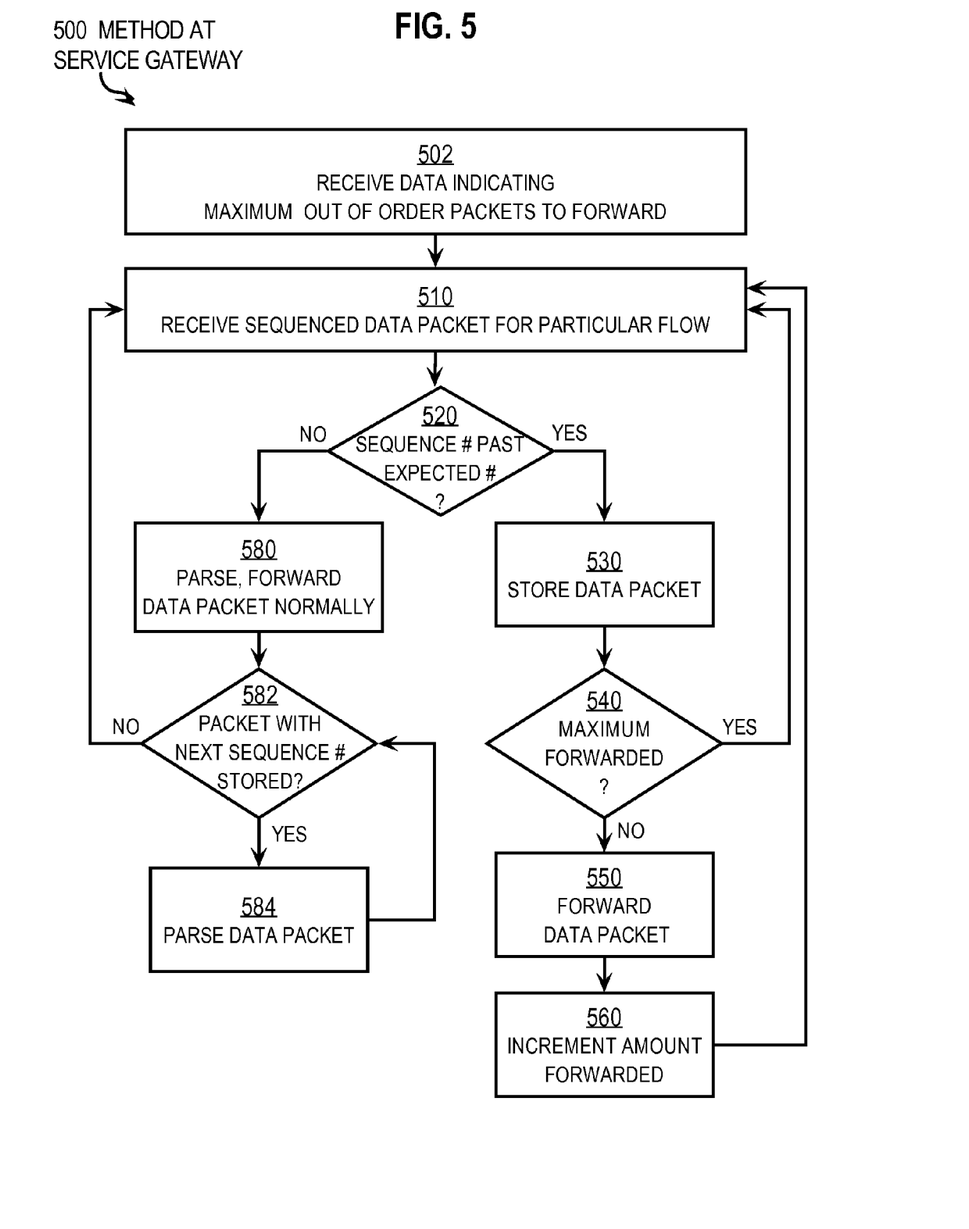
FIG. 5 illustrates at a high level a method for parsing on a content gateway.

FIG. 5 illustrates at a high level a method 500 for parsing on a content gateway, such as on content gateway 160. Although steps in FIG. 5 are shown in a particular order for purposes of illustration, in other embodiments, one or more steps may be performed in a different order or overlapping in time, in series or in parallel, or one or more steps may be omitted or added, or changed in some combination of ways.

In step 502, data is received that indicates a maximum number of out of order packets to forward. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods. In some embodiments, step 502 is omitted. For example, in embodiments in which the users are trusted, or other mechanisms are used to prevent fraud, step 502 is omitted.

For purposes of illustration, it is assumed that the data receive during step 502 indicates whichever comes first of: 0.5 seconds; or 64,000 unparsed bytes forwarded, or a limited number of data packets after sufficient acknowledgments have been received to trigger a fast re-transmit.

In other embodiments, a network administrator determines through experimentation what maximum has the desired results of balancing good network performance with tolerable forwarding of data packets that are never parsed and may be fraudulent.

In step 510 a sequenced data packet is received for a particular flow. For example, TCP data packet 451a is received during step 510.

In step 520, it is determined whether the data packet is out of order, e.g., whether the sequence number in the data packet just received is past a next expected sequence number. If not control passes to step 580.

In step 580, the data packet is parsed normally for any purpose, as in prior art content gateways and forwarded. For example, the TCP data packet 451 a is parsed for billing purposes. Control then passes to step 582.

In step 582, it is determined whether any data packets are stored with the next expected sequence numbers. If not, control passes back to step 510 to receive the next data packet for the flow. If so, control passes to step 584 to parse the data packet with the next sequence value, but not forward it (it has already been forwarded when stored). Control then passes back to step 582.

For example, when TCP data packet 457a is received in step 510 with the missing sequence #2, that data packet is parsed and forwarded in step 580. In step 582 it is determined that a data packet with the next sequence #3 is stored; and control passes to step 584 to parse stored TCP data packet 453a with sequence #3. In step 582 it is determined that a data packet with the next sequence #4 is stored; and control passes back to step 584 to parse stored TCP data packet 454a with sequence #4. This loop repeats until no more are stored or the next data packet stored is pasted the next expected sequence number; then control passes back to step 510 to receive the TCP data packet indicated by ellipsis 493. Stored data packets are marked for deletion after parsing in some embodiments. If a data packet is stored that is not the next expected sequence number, that packet is not parsed, but left in storage for parsing when the skipped packet is received.

If it is determined in step 520 that the data packet received in step 510 is out of order, control passes to step 530. In step 530, the data packet is stored for subsequent parsing. Control then passes to step 540.

In step 540, it is determined whether the maximum out of order packets to forward have already been forwarded. If so, the packet is not forwarded and control passes back to step 510 to receive the next sequenced data packet for the flow.

Any method may be used to determine whether the maximum have already been forwarded. In the illustrated embodiment, it is determined whether 0.5 seconds have passed since the first out of order packet has been forwarded, or over 64,000 bytes will be forwarded if the current data packet is forwarded, or a limited number of data packets after sufficient acknowledgments have been received to trigger a fast retransmit. If none of these conditions are satisfied, control passes to step 550.

For example, when TCP data packet 453$a$ is received, no out of order data packet has yet been forwarded and a counter for elapsed time has not yet started, so control passes to step 550.

In step 550, the data packet is forwarded. For example, TCP data packet 453$a$ is forwarded as TCP data packet 453$b$.

In step 560, the amount forwarded is incremented. For example, a clock counter is initiated, the number of bits forwarded is incremented by the size of data packet 453$a$. Control then passes back to step 510 to receive the next sequenced data packet of the flow.

In some embodiments, steps 540 and 560 are omitted. For example, in embodiments in which the users are trusted, or other mechanisms are used to prevent fraud, step 540 and step 560 are omitted.

5.0 Implementation Mechanisms—Hardware Overview

Figure 6:
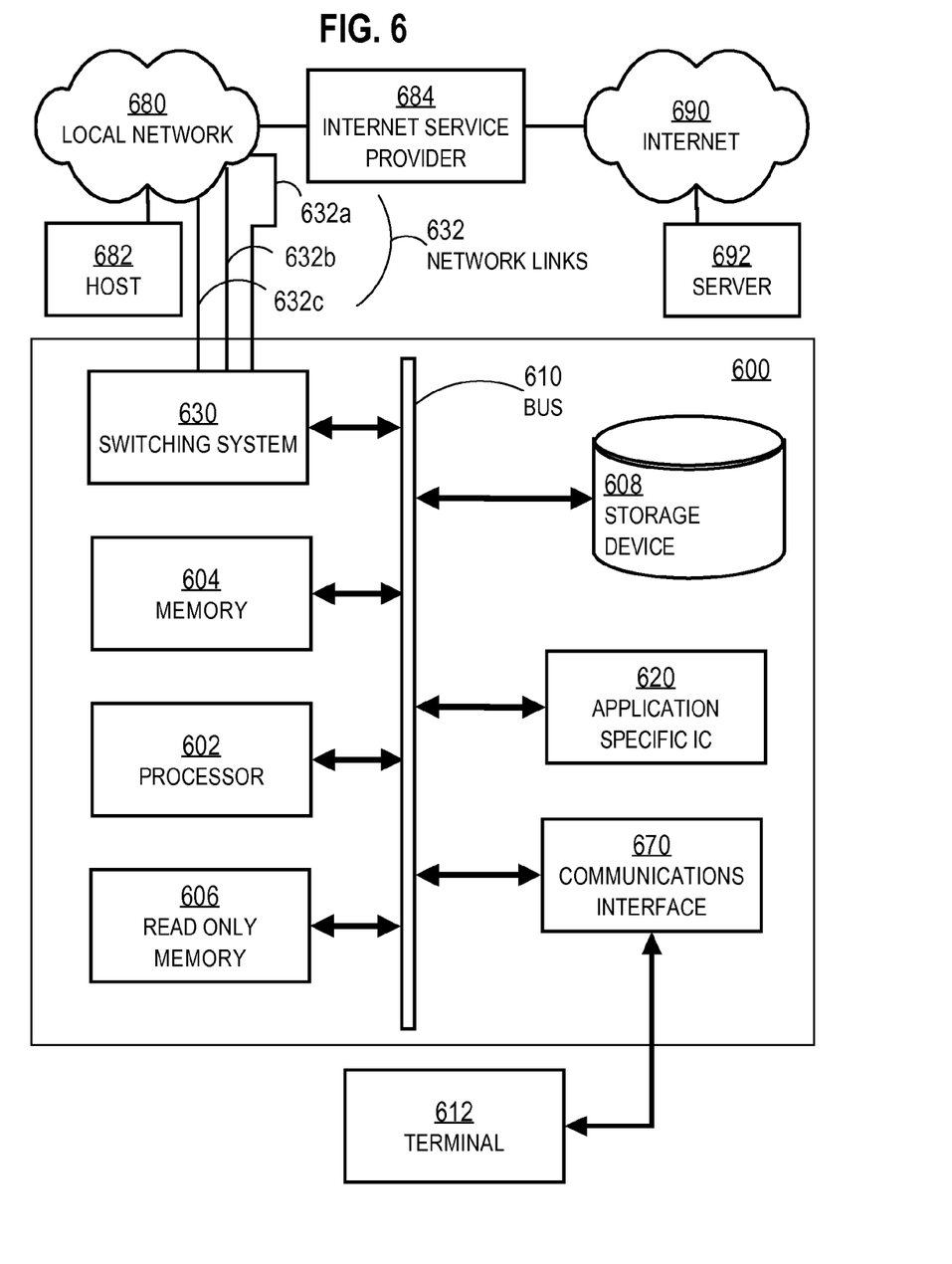
FIG. 6 illustrates a computer system upon which an embodiment of the invention may be implemented.

FIG. 6 illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software.

The signals transmitted over network link 632 and other networks through communications interfaces such as interface 670, which carry information to and from computer system 600, are example forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving, at a local node of a network, a plurality of sequenced data packets from a source node directed toward a destination node, wherein the local node executes a transmission control protocol/Internet protocol (TCP/IP) communications scheme in which packet transmissions are systematically acknowledged by receiving network nodes, and wherein the plurality of sequenced data packets include a first data packet, a third data packet, and a fourth data packet associated with an ordered transmission control protocol (TCP) flow;
determining that a second data packet is missing from the flow;
communicating, by the local node, a selective acknowledgement (SACK) for only the first data packet, which is forwarded toward the destination node; and
storing the third data packet and the fourth data packet, wherein the third data packet and the fourth packet are not parsed and are withheld from being forwarded toward the destination node, wherein a time interval is exceeded such that respective SACK messages have not been received by the source node for the second, third, and fourth data packets, which causes a retransmission of the second, third, and fourth data packets, and wherein the retransmitted second, third, and fourth data packets are received, parsed, and forwarded toward the destination node.

2. A method as recited in claim 1, wherein:
the method further comprises receiving data that indicates a maximum amount of out of order data to forward; and
said step of forwarding further comprising the steps of:
determining a forwarded amount of data of the plurality of sequenced data packets, which data has been forwarded since receiving an earliest out of order data packet of the plurality of sequenced data packets;
determining whether the forwarded amount is less than the maximum amount, and
performing said step of forwarding a selected one of the plurality of sequenced data packets toward the destination node before parsing the selected one of the plurality of sequenced data packets only if the forwarded amount is less than the maximum amount.

3. A method as recited in claim 2, wherein the maximum amount of out of order data to forward is based on a tolerance for sequenced data packets that is not described for administration of the network.

4. A method as recited in claim 1, wherein the local node is a content aware gateway node for the network.

5. A method as recited in claim 1, wherein the first sequenced data packet is a Transport Control Protocol (TCP) data packet.

6. A method as recited in claim 5, wherein the plurality of sequenced data packets is a TCP session.

7. A method as recited in claim 1, wherein the plurality of sequenced data packets is to be parsed by the local node to determine particular data in the plurality of sequenced data packets used to determine an amount to bill a user of the source node or a user of the destination node or both.

8. A method as recited in claim 1, further comprising determining whether an expected data packet of the plurality of sequenced data packets that precedes the third sequenced data packet has not yet been received at the local node.

9. An apparatus comprising:
means for receiving, at a local node, a plurality of sequenced data packets from a source node directed toward a destination node, wherein the local node executes a transmission control protocol/Internet protocol (TCP/IP) communications scheme in which packet transmissions are systematically acknowledged by receiving network nodes, and wherein the plurality of sequenced data packets include a first data packet, a third data packet, and a fourth data packet associated with an ordered transmission control protocol (TCP) flow;
means for determining that a second data packet is missing from the flow;
means for communicating, by the local node, a selective acknowledgement (SACK) for only the first data packet, which is forwarded toward the destination node; and
means for storing the third data packet and the fourth data packet, wherein the third data packet and the fourth packet are not parsed and are withheld from being forwarded toward the destination node, wherein a time interval is exceeded such that respective SACK messages have not been received by the source node for the second, third, and fourth data packets, which causes a retransmission of the second, third, and fourth data packets, and wherein the retransmitted second, third, and fourth data packets are received, parsed, and forwarded toward the destination node.

10. An apparatus as recited in claim 9, wherein:
the apparatus further comprises means for receiving data that indicates a maximum amount of out of order data to forward; and
said means for forwarding further comprises
means for determining a forwarded amount of data of the plurality of sequenced data packets, which data has been forwarded since receiving an earliest out of order data packet of the plurality of sequenced data packets;
means for determining whether the forwarded amount is less than the maximum amount, and
means for performing said step of forwarding a selected one of a plurality of sequenced data packets toward the destination node before parsing a selected one of a plurality of sequenced data packets only if the forwarded amount is less than the maximum amount.

11. An apparatus as recited in claim 10, wherein the maximum amount of out of order data to forward is based on a tolerance for sequenced data packets that is not described for administration of the network.

12. An apparatus as recited in claim 9, wherein the apparatus is configured as a content aware gateway node for the network.

13. An apparatus comprising:
a network interface that is configured for communicating a data packet with a packet-switched network;
logic encoded in one or more tangible media and, when executed, operable to perform for:
receiving a plurality of sequenced data packets from a source node directed toward a destination node, wherein the local node executes a transmission control protocol/Internet protocol (TCP/IP) communications scheme in which packet transmissions are systematically acknowledged by receiving network nodes, and wherein the plurality of sequenced data packets include a first data packet, a third data packet, and a fourth data packet associated with an ordered transmission control protocol (TCP) flow;
determining that a second data packet is missing from the flow;

communicating a selective acknowledgement (SACK) for only the first data packet, which is forwarded toward the destination node; and storing the third data packet and the fourth data packet, wherein the third data packet and the fourth packet are not parsed and are withheld from being forwarded toward the destination node, wherein a time interval is exceeded such that respective SACK messages have not been received by the source node for the second, third, and fourth data packets, which causes a retransmission of the second, third, and fourth data packets, and wherein the retransmitted second, third, and fourth data packets are received, parsed, and forwarded toward the destination node.

14. An apparatus as recited in claim 13, wherein:

the logic, when executed, is further operable to perform the step of receiving data that indicates a maximum amount of out of order data to forward; and said forwarding further comprises determining a forwarded amount of data of the plurality of sequenced data packets, which data has been forwarded since receiving an earliest out of order data packet of the plurality of sequenced data packets;

determining whether the forwarded amount is less than the maximum amount, and performing said forwarding of a selected sequenced data packet toward the destination node before parsing the selected sequenced data packet only if the forwarded amount is less than the maximum amount.

15. An apparatus as recited in claim 14, wherein the maximum amount of out of order data to forward is based on a tolerance for sequenced data packets that is not described for administration of the network.

16. An apparatus as recited in claim 13, wherein the apparatus is configured as a content aware gateway node for the network.

17. An apparatus as recited in claim 13, wherein the packets are Transport Control Protocol (TCP) data packets.

18. An apparatus as recited in claim 17, wherein the plurality of sequenced data packets is a TCP session.

19. An apparatus as recited in claim 13, wherein the plurality of sequenced data packets is to be parsed by the apparatus to determine particular data among the plurality of sequenced data packets used to determine an amount to bill a user of the source node or a user of the destination node or both.

20. An apparatus as recited in claim 13, further comprising determining whether an expected data packet of the plurality of sequenced data packets that precedes the third sequenced data packet has not yet been received.

* * * * *